United States Patent
Hickey et al.

(10) Patent No.: US 12,204,885 B2
(45) Date of Patent: Jan. 21, 2025

(54) OPTIMIZING OPERATOR CONFIGURATION IN CONTAINERIZED ENVIRONMENTS

(71) Applicant: INTERNATIONAL BUSINESS MACHINES CORPORATION, Armonk, NY (US)

(72) Inventors: Martin Hickey, Cork (IE); Eugene Michael Maximilien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 18/177,860

(22) Filed: Mar. 3, 2023

(65) Prior Publication Data
US 2024/0248695 A1 Jul. 25, 2024

(30) Foreign Application Priority Data
Jan. 19, 2023 (GB) ...................................... 2300780

(51) Int. Cl.
*G06F 8/61* (2018.01)
*G06F 8/71* (2018.01)

(52) U.S. Cl.
CPC . *G06F 8/61* (2013.01); *G06F 8/71* (2013.01)

(58) Field of Classification Search
CPC ..................................... G06F 8/61; G06F 8/71
See application file for complete search history.

(56) References Cited

U.S. PATENT DOCUMENTS

| | | | |
|---|---|---|---|
| 11,861,352 B2* | 1/2024 | Baral | G06Q 10/06 |
| 2019/0018671 A1 | 1/2019 | Zhu | |
| 2020/0089542 A1* | 3/2020 | Nash | G06F 9/5027 |
| 2020/0379892 A1 | 12/2020 | Velipasaoglu | |
| 2021/0149650 A1 | 5/2021 | Hadi Salim | |
| 2022/0052933 A1 | 2/2022 | Bhatnagar | |

FOREIGN PATENT DOCUMENTS

| | | | | |
|---|---|---|---|---|
| CN | 111488213 A | * | 8/2020 | G06F 9/45558 |
| CN | 111984381 A | | 11/2020 | |
| CN | 111367798 B | * | 5/2021 | G06F 11/3608 |

OTHER PUBLICATIONS

"Patents Act 1977: Search Report under Section 17(5)", Intellectual Property Office, Application No. GB2300780.0, Jul. 6, 2023, 3 pgs.
(Continued)

*Primary Examiner* — Phillip H Nguyen
(74) *Attorney, Agent, or Firm* — James L. Olsen

(57) ABSTRACT

Computer technology for optimizing operator configuration for deployment of an application in a container orchestration cluster. The computer technology includes machine logic for performing the following operations: collecting historical data for deployment data including operator configurations, cluster configurations, and behavior data. The method models the deployment data using embedded matrix models; and applies collaborative filtering to process the modeled data to map user requirements for a target deployment to deployment configurations of previous successful deployments; to output one or more predicted deployment configurations as a reference for the target deployment.

18 Claims, 5 Drawing Sheets

(56) References Cited

OTHER PUBLICATIONS

Delimitrou, et al., "Paragon: QoS-aware Scheduling for Heterogeneous Datacenters", published in ASPLOS '13: Proceedings of the eighteenth international conference on Architectural support for programming languages and operating systems, Mar. 16, 2013, 12 pgs.

"Collaborative filtering", From Wikipedia, the free encyclopedia, Downloaded from the internet on Jan. 26, 2023, 12 pgs, <https://en.wikipedia.org/wiki/Collaborative_filtering>.

"Collaborative Filtering", Machine Learning, Google, Downloaded from the Internet on Jan. 26, 2023, 6 pgs., <https://developers.google.com/machine-learning/recommendation/collaborative/basics>.

"Federator.ai", OperatorHub.io, Downloaded from the Internet on Jan. 26, 2023, <https://operatorhub.io/operator/federatorai>.

"Integrations with IBM Turbonomic", IBM, Downloaded from the Internet on Jan. 26, 2023, 10 pgs., <https://www.ibm.com/products/turbonomic/integrations>.

"Linear map", From Wikipedia, the free encyclopedia, Downloaded from the Internet on Jan. 26, 2023, 14 pgs., <https://en.wikipedia.org/wiki/Linear_map>.

"Wisdom of the Crowd", From Wikipedia, the free encyclopedia, Downloaded from the Internet on Jan. 26, 2023, 9 pgs., <https://en.wikipedia.org/wiki/Wisdom_of_the_crowd>.

Abernethy, et al., "A New Approach to Collaborative Filtering: Operator Estimation with Spectral Regularization", Journal of Machine Learning Research 10, Mar. 2009, 24 pgs.

He, et al., "Neural Collaborative Filtering", WWW '17: Proceedings of the 26th International Conference on World Wide Web, Apr. 2017, Abstract Only, 4 pgs., <https://doi.org/10.1145/3038912.3052569>.

Hickey, et al., "Optimizing Operator Configuration in Containerized Environments", United Kingdom Patent Application, Application No. 2300780.0, filed on Jan. 19, 2023, 29 pgs.

Liang, et al., "Variational Autoencoders for Collaborative Filtering", Track: User Modeling, Interaction and Experience on the Web, Apr. 23-27, 2018, Lyon, France, 10 pgs., <https://doi.org/10.1145/3178876.3186150>.

\* cited by examiner

OPTIMIZING OPERATOR CONFIGURATION IN CONTAINERIZED ENVIRONMENTS

BACKGROUND

The present invention relates to containerized environments, and more specifically, to operator optimization for deploying a new application in a containerized environment.

An operator in a containerized environment provides a method of packaging, deploying, and managing a containerized application in a containerization orchestration cluster. An operator is an application-specific controller that extends the functionality of a container orchestration application programming interface to create, configure, and manage instances of complex applications on behalf of a user.

An operator software development kit may provide developer and runtime tools to accelerate development of an operator for an application.

SUMMARY

According to an embodiment of the present invention there is provided a computer-implemented method for optimizing operator configuration for deployment of an application in a container orchestration cluster, the method including historical data for deployment data including operator configurations, cluster configurations, and behavior data; modeling the deployment data using embedded matrix models; applying collaborative filtering to process the modeled data to map user requirements for a target deployment to deployment configurations of previous successful deployments; and outputting one or more predicted deployment configurations as a reference for the target deployment.

Some embodiments may include the advantage of providing target deployment configurations with efficient use of resources by an operator in a cluster configuration based on existing deployments.

According to another embodiment of the present invention there is provided a computer system for optimizing operator configuration for deployment of an application in a container orchestration cluster, the system including one or more processors, one or more memories, and one or more computer readable hardware storage devices, the one or more hardware storage devices containing program code executable by the one or more processors via the one or more memories to implement functions of the following components: a collecting component for collecting historical data for deployment data including operator configurations, cluster configurations, and behavior data; a modeling component for modeling the deployment data using embedded matrix models; a collaborative filtering component for applying collaborative filtering to process the modeled data to map user requirements for a target deployment to deployment configurations of previous successful deployments; and a predication component for outputting one or more predicted deployment configurations as a reference for the target deployment.

According to another embodiment of the present invention there is provided a computer program product for optimizing operator configuration for deployment of an application in a container orchestration cluster, the computer program product including a computer readable storage medium having program instructions embodied therewith, the program instructions executable by a processor to cause the processor to: collect historical data for deployment data including operator configurations, cluster configurations, and behavior data; model the deployment data using embedded matrix models; apply collaborative filtering to process the modeled data to map user requirements for a target deployment to deployment configurations of previous successful deployments; and output one or more predicted deployment configurations as a reference for the target deployment.

The computer readable storage medium may be a non-transitory computer readable storage medium and the computer readable program code may be executable by a processing circuit.

According to an aspect of the present invention, there is a method, computer program product and/or system that performs the following operations (not necessarily in the following order): (i) collecting historical data for deployment data including operator configurations, cluster configurations, and behavior data; (ii) modeling the deployment data using embedded matrix models; (iii) applying collaborative filtering to process the modeled data to map user requirements for a target deployment of an application to deployment configurations of previous successful deployments; (iv) outputting one or more predicted deployment configurations as a reference for the target deployment; and (v) optimizing operator configuration for the deployment configuration of the application in a target container orchestration cluster.

BRIEF DESCRIPTION OF THE DRAWINGS

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for optimizing operator configuration in containerized environments for deployment of an application.

The described method collects historical data for operator configurations for successfully deployed applications and applies collaborative filtering to process the collected data to map application requirements to deployment configurations to provide stored operator configurations. Collaborative filtering is applied for the non-trivial processing of container orchestration data.

When deploying a new application, the method determines similarities between a target operator for deploying the new application and the stored operator configurations to output one or more stored deployment configurations as a reference for the target deployment. The deployment configurations may include operator configurations and cluster configurations for an application deployment.

The method provides automated operator configuration deployment based on past successful interactions. This enables operators to be deployed to a cluster in an optimized fashion. The operator configuration optimization in some embodiments of the present invention, is an improvement in the technical field of computer programming generally and more particularly in the technical field of containerized environments.

A container orchestration human user is able to modify the configuration of an operator to deploy their application in an optimized fashion. This uses existing configurations from other users who have successfully deployed similar applications in an optimized fashion.

Figure 1A:
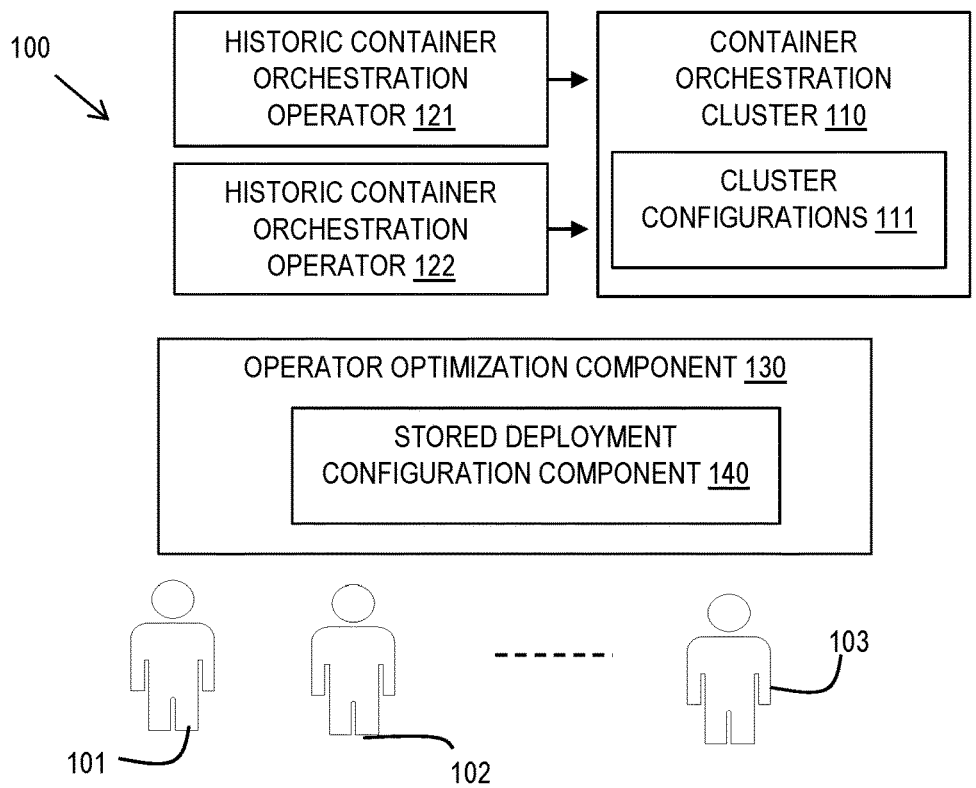
FIGS. 1A and 1B are block diagrams illustrating example aspects of the method and system in accordance with embodiments of the present invention.
Figure 1B:
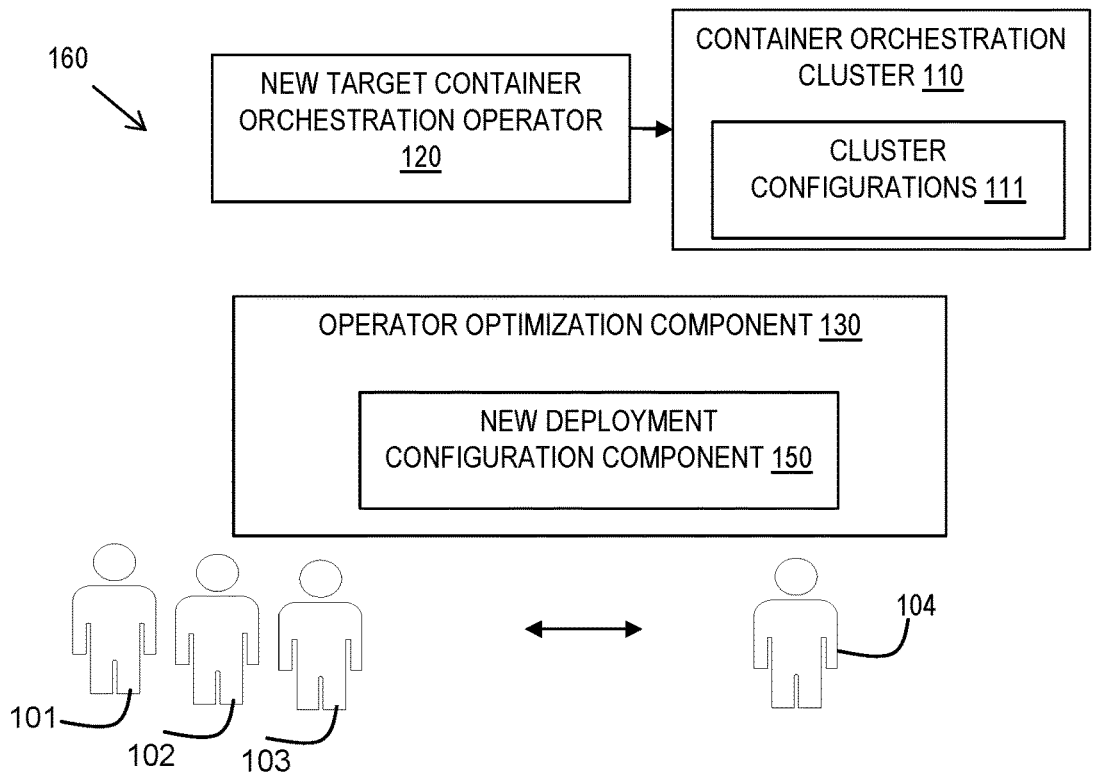

Referring to FIG. 1A and FIG. 1B, diagrams 100, 160 illustrate an example embodiment of the described method and system. FIG. 1A and FIG. 1B show a container orchestration cluster 110 in which applications are deployed using container orchestration operators. A container orchestration operator is an application-specific controller that extends the functionality of a container orchestration application programming interface (API) to create, configure, and manage instances of complex applications on behalf of a container orchestration user.

In FIG. 1A and FIG. 1B, an operator optimization component 130 is provided that uses configurations of historic container orchestration operators 121, 122 of successful applications to optimize a new target container orchestration operator 120.

FIG. 1A shows historic container orchestration operators 121, 122 that are configured by users 101-103. The operator optimization component 130 includes a stored deployment configuration component 140 for collecting configuration data of the historic container orchestration operators 121, 122 and the cluster configurations 111 and applying collaborative filtering to process the collected data to map application requirements to configurations to provide stored deployment configurations.

FIG. 1B shows the container orchestration cluster 110 with a user 104 who intends to configure a new target container orchestration operator 120 for a new application. The operator optimization component 130 includes a new deployment configuration component 150 for suggesting a deployment configuration to the user 104 for the new target container orchestration operator 120 based on the stored deployment configurations. A recommended configuration is provided to the user 104 based on the operator and cluster configurations optimized by the other users 101-103.

Figure 2A:
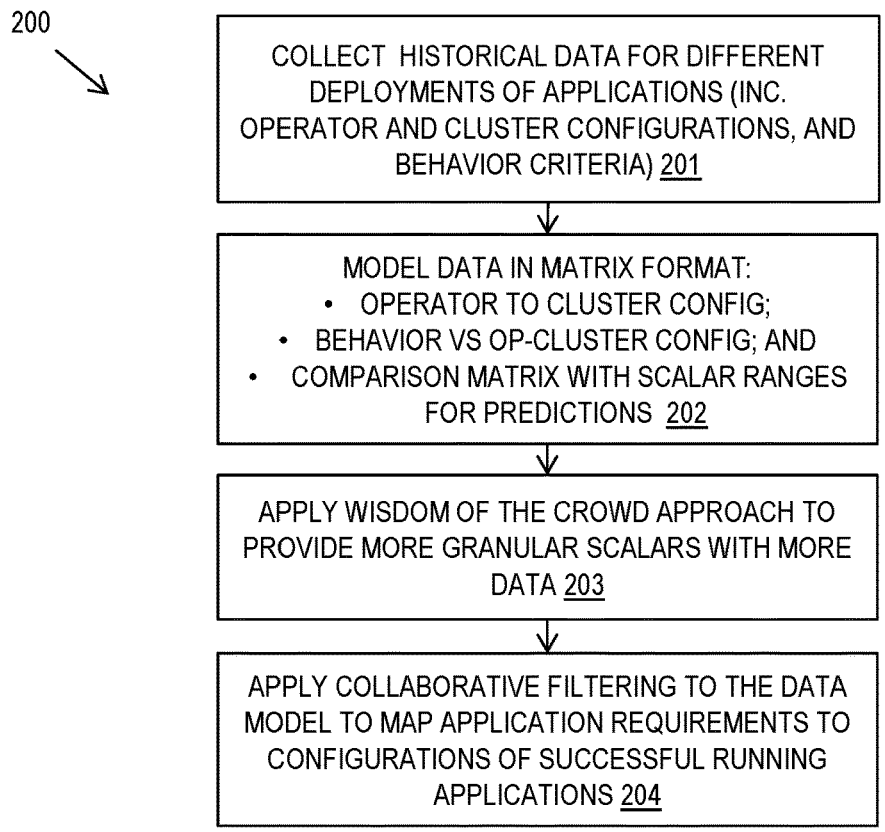
FIGS. 2A and 2B are a flow diagram of example embodiments of aspects of a method in accordance with embodiments of the present invention.

Referring to FIG. 2A, a flow diagram 200 shows an example embodiment of the described method. User approval may be required to persist data for analysis.

The method may collect 201 historical deployment data for different application deployments across different clusters. The method may determine the configurations for deploying existing applications in an orchestration environment. The deployment data may include cluster configuration data, operator configuration data, and behavior data. The deployment data obtains existing configurations from other users who have successfully deployed applications.

The cluster configuration data may include: compute resources; node information; a number of pods per node; pod limitations; etc. The operator configuration data may include: compute resources per pod/container; a number of pods; service ports; etc. The behavior data may include a number of characteristics or features such as user loads, runtime speed, number of failures, and so on.

The configurations are collected and stored from a large number of successful deployments. The successful application deployments may be rated by performance metrics that may be included in the behavior data. The data collection may be continuously updated from cloud deployments. The collection of the data which provides enough data to accurately recommend operator optimized configurations may take time from initial startup to be useful for recommendations.

The method may model 202 the collected deployment data of existing applications in a matrix format. The data model matrices may include: operator to cluster configurations; behavior criteria compared to operator to cluster configurations; and a comparison matrix using a scalar range for predictions. The scalar values may be based on a range from −1 to +1 for negative to positive ranges of the behavior criteria as relating to user requirements.

The method may apply 203 "Wisdom of the Crowd" approach to provide more accurate matrices, with scalars becoming more granular (with less bias) as data is collected. An explanation for this phenomenon is that there is idiosyncratic noise associated with each individual judgment, and taking the average over a large number of responses will go some way toward cancelling the effect of this noise.

The method may apply 204 collaborative filtering to process the modeled data to map application or deployment requirements to configurations of successful applications. This is described further with reference to FIG. 2B below.

Applying collaborative filtering may use multiple dimensions based on user requirement criteria. The collaborative filtering may include applying size categories to operator and cluster configurations. For example, this may use T-shirt sizing categories indicating resource requirements of the configurations.

Empirical data from the cloud for different operators and cluster configurations may be processed using collaborative filtering methods to help predict deployment configurations. Applying the artificial intelligence technique of collaborative filtering may be used for the non-trivial processing of the orchestration data by mapping the application's requirements to the existing successful running applications from the obtained existing configurations from other users.

Figure 2B:
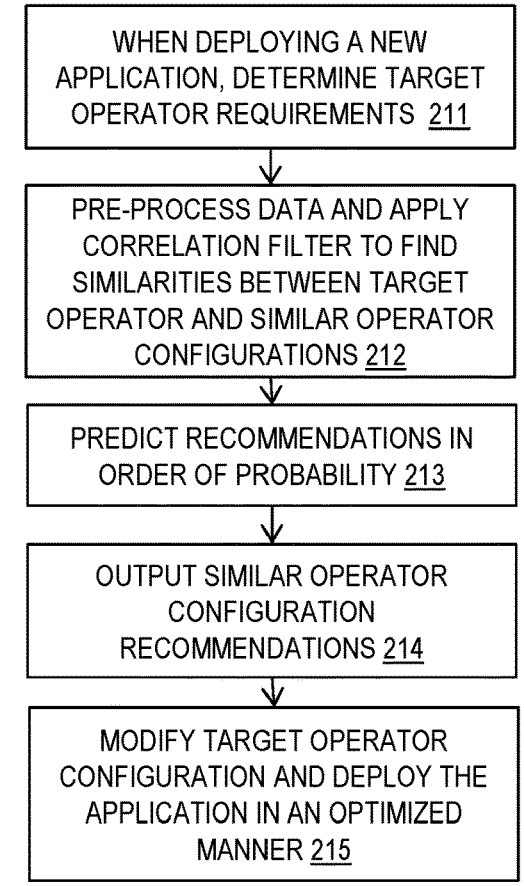

Referring to FIG. 2B, a flow diagram 210 shows an example embodiment of the described method. When deploying a new application, the method may determine 211 target deployment requirements for an operator for the new application for which a configuration recommendation is required.

The method may pre-process the data and apply a correlation filter 212 to find similarities between user requirements for a target deployment for deploying the new application and the stored deployment configurations. The pre-processing may parse the input request and convert it into the criteria/context format as expected by the collaborative filtering algorithm. This facilitates the similarity computation to be executed as the comparison can be made.

Filtering uses more than one dimension to represent user criteria (Criteria x D dimensional embedding is used to represent the user requirements), while prediction is the deployment configuration (in this case, cluster/operator configuration).

The method may predict 213 recommendations of configurations in order of probability based on the data models and with dimension embedding which represents the user requirements. In the example, below three dimensional embedding is used with the user criteria of "user load", "runtime speed", and "number of failures".

The method may output 214 one or more similar deployment configuration recommendations in order of probability. The method may modify 215 a target deployment of an operator configuration to deploy the application in an optimized manner with the operator and cluster configurations.

A cloud provider has visibility over the whole ecosystem and can infer how best to deploy operators to the cloud. This is used to collect the required data of historic operators to be able to automate the configuration to optimize the operator deployment.

In the described method, artificial intelligence is used to interpret orchestration metrics to help the target operator to take advantage of a cluster configurations. Collaborative filtering uses metrics across users by the following steps.
Lots of users are using operators and the method anonymously looks at what they are doing;
Empirical data is gathered for different operators and configurations; and
The empirical data is processed using collaborative filtering to help predict successful configurations for a target operator.

This results in a recommendation to a user that is based on similar users that used an operator with a given deployment configuration (of operator and cluster configuration) for a similar application in a cluster environment.

Collaborative filtering is based on the past interactions that have been recorded between users and items, in order to produce new recommendations. Therefore, the method uses past optimized operator deployment configurations to produce recommendations to similar users.

Figure 3:
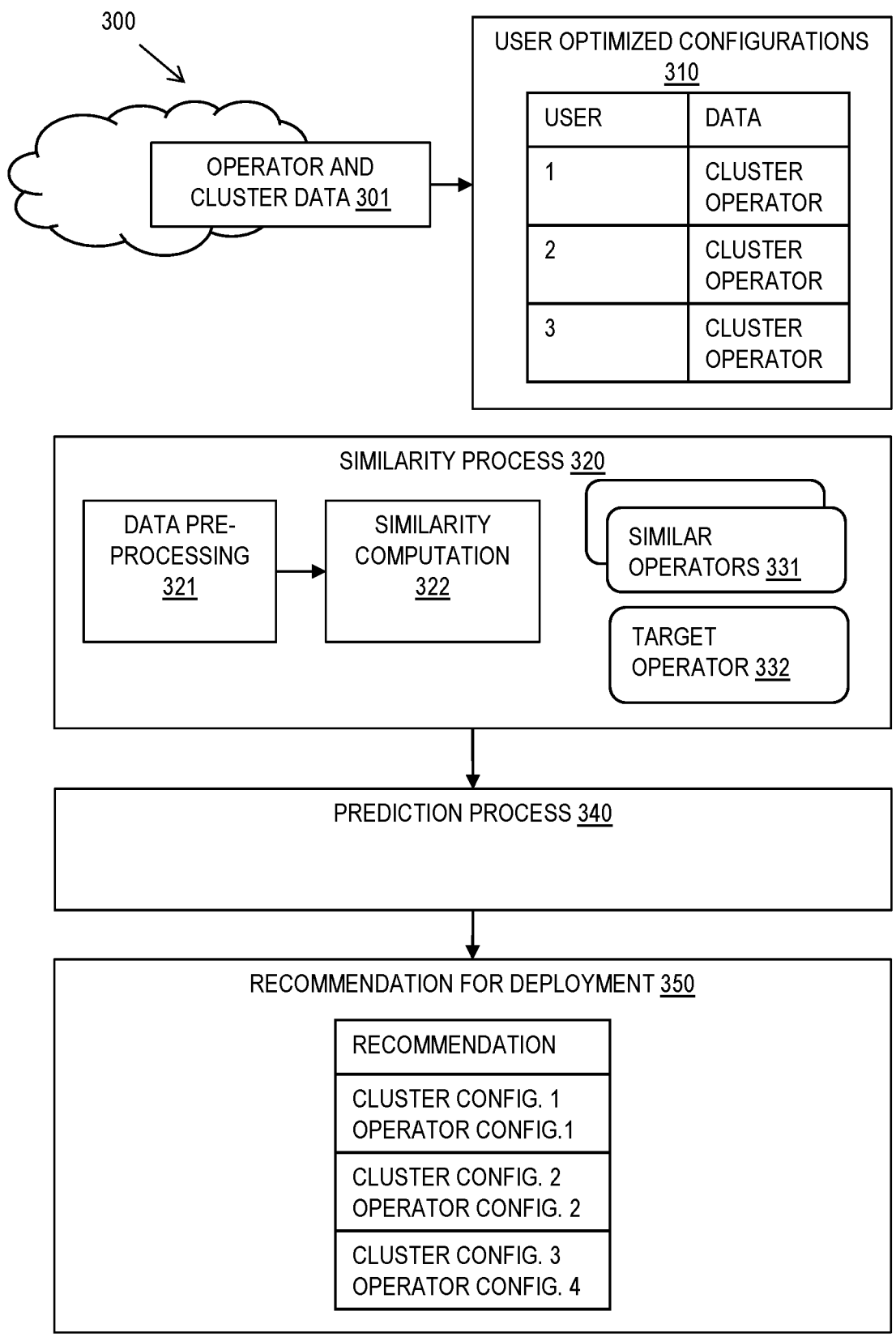
FIG. 3 is a schematic diagram of a flow of an example embodiment of the described method in accordance with embodiment of the present invention.

Referring to FIG. 3, a schematic block diagram 300 shows an example embodiment illustrating the described method and system. Operator and cluster data 301 are gathered from a cloud ecosystem to store as user optimized configurations 310. The configurations may be referenced by users who compiled the cluster and operator configuration data.

A similarity process 320 may compare a target operator 332 for a new application to similar operators 331 that were successfully used in past applications. The similarity process 320 may use a data pre-processing 321 and a similarity computation 322. The pre-processing parses the input request and converts it into the criteria/context format as expected by the collaborative filtering algorithm. This facilitates the similarity computation to be executed as the comparison can be made.

A prediction process 340 may then predict optimized deployment configurations to output a set of recommendations for deployment 350 in the form of cluster and operator configurations as described in the flow diagrams of FIG. 2A and FIG. 2B.

Learned Data: Data Collection

In a cloud environment, user approval may be required to persist orchestration cluster data. When an operator is deployed to a cluster, the following data is collected:
Deployment configurations in the form of cluster and operator configurations; and
Behavioral criteria, which is used for user requirements in the filtering.

Data persisted may include:
Cluster:
Compute resources: memory, processor; and network bandwidth;
Size, type and number of nodes;
[ . . . ]
Operator:
Compute resources (memory, processor, and network) per pod/container (This may be categorized by T-shirt sizing using S/M/L/XL/XXL etc.)
Number of pods (replicas)
[ . . . ]
Behavioral:
User load (Sizing like 10s, 100s, 1000s, etc.);
Runtime speed;
Number of failures;
[ . . . ]

"T-shirt sizing" is used as a project estimation and capacity planning measure that helps track how many resources. A task or configuration may be assigned a T-shirt size, for example, from XS to XXL, to represent that configurations resources.

The data collection is then spread across multiple clusters to broaden the data and minimize biases.

Learned Data: Cluster Configuration Sizing.

| Cluster size | Compute | Node | Pod per Node | Pod Limits |
|---|---|---|---|---|
| Small | Small | 500 | 30 | CPU: 100 m Mem: 256 Mi |
| [ . . . ] Medium | [ . . . ] Medium | [ . . . ] 1000 | [ . . . ] 55 | [ . . . ] CPU: 500 m Mem: 512 Mi |
| [ . . . ] Large | [ . . . ] Large | [ . . . ] 5000 | [ . . . ] 110 | [ . . . ] CPU: 1000 m Mem: 1024 Mi |
| [ . . . ] | [ . . . ] | [ . . . ] | [ . . . ] | [ . . . ] |

Learned Data: Operator Configuration Sizing.

| Operator size | Pod Compute Request | Replicas | Service Ports |
|---|---|---|---|
| Small | CPU: 100 m Mem: 128 Mi | 2 | 1 |
| [ . . . ] Medium | [ . . . ] CPU: 200 m Mem: 256 Mi | [ . . . ] 20 | [ . . . ] 5 |
| [ . . . ] Large | [ . . . ] CPU: 500 m Mem: 512 Mi | [ . . . ] 100 | [ . . . ] 20 |
| [ . . . ] | [ . . . ] | [ . . . ] | [ . . . ] |

Learned Data: Data Modeling.
Data model matrices are generated as follows:
Operator-cluster configuration in T-shirt sizes;
Behavioral criteria compared to operator-cluster configuration in T-shirt sizes; and
Comparison matrix uses scalar range for predictions.

Data models are continually updated and improved by continuous data collection from the cloud.

Using the "Wisdom of the Crowd" approach to provide more accurate matrices, with scalars becoming more granular as more data is collected (non-bias).

Data Models: Cluster-Operator T-Shirt Size Configurations.

| Configuration Name | Operator Sizing | | Cluster Sizing |
|---|---|---|---|
| SM-SM | [ . . . ] | Small | Small |
| [ . . . ] | [ . . . ] | [ . . . ] | [ . . . ] |
| SM-MED | [ . . . ] | Small | Medium |
| [ . . . ] | [ . . . ] | [ . . . ] | [ . . . ] |
| SM-LRG | [ . . . ] | Small | Large |
| [ . . . ] | [ . . . ] | [ . . . ] | [ . . . ] |
| MED-MED | [ . . . ] | Medium | Medium |
| [ . . . ] | [ . . . ] | [ . . . ] | [ . . . ] |
| MED-LRG | [ . . . ] | Medium | Large |
| [ . . . ] | [ . . . ] | [ . . . ] | [ . . . ] |
| LRG-LRG | [ . . . ] | Large | Large |
| [ . . . ] | [ . . . ] | [ . . . ] | [ . . . ] |

Data Models: Behavior vs Configuration Dimensions.

| | SM-SM | [...] | SM-MED | [...] | SM-LRG | [...] | MED-MED | [...] | MED-LRG |
|---|---|---|---|---|---|---|---|---|---|
| User load | −1 | [...] | −1 | [...] | −1 | [...] | 0 | [...] | 0 |
| Runtime speed | −.8 | [...] | −.6 | [...] | −.3 | [...] | 0 | [...] | .2 |
| [...] | [...] | [...] | [...] | [...] | [...] | [...] | [...] | [...] | [...] |
| Number of failures | −.7 | [...] | −.6 | [...] | −.5 | [...] | .1 | [...] | .2 |

A scalar in [−1, 1] range may be assigned to each criterion (number of failures, runtime speed, etc.) as follows:
User loads:
    −1: 1-10 users
    +1: 100K-1M users
Runtime speed:
    −1: 1-100 Sec
    +1: <1 mSec
. . . <m> Criteria
Number of failures:
−1: 10 per hour
+1: 1 per day
Implementation: Prediction Example

| | SM-SM | SM-MED | SM-LRG | MED-MED | MED-LRG | LRG-LRG |
|---|---|---|---|---|---|---|
| User load | −1 | −1 | −1 | 0 | 0 | 1 |
| Runtime speed | −.8 | −.6 | −.3 | 0 | .2 | 1 |
| Number of failures | −.7 | −.6 | −.5 | .1 | .2 | 1 |

User Criteria of Operator Types.

| User load | Runtime Speed | Number of Failures | Operator Name |
|---|---|---|---|
| 1 | 1 | 1 | Knative (RTM) |
| −1 | 0 | 0 | Credential Rotator |

Prediction Outcome.

| SM-SM | SM-MED | SM-LRG | MED-MED | MED-LRG | LRG-LRG | Operator Name |
|---|---|---|---|---|---|---|
| | | | | | X | Knative (RTM) |
| | | | X | | | Credential Rotator |

The example prediction uses two different types of operators (for example, Knative Operator (Knative is a trademark of Google LLC) and Credential Rotator Operator) which would like to be deployed in an optimized fashion. At a user/high level, the key requirement for the Knative® operator is that no matter how many requests come in (high request load), the response time on average is consistent and constant. The pre-processing would then convert this into a criteria/context format of: high user load, fast runtime, and minimal downtime.

At a user/high level, the key requirement for the Credential Rotator operator is that periodic requests can be handled in a reasonable time frame. The pre-processing would then convert this into a criteria/context format of: low user load, average runtime speed, and average downtime.

The prediction then occurs by finding an item (in this case T-shirt size configuration) which best matches the criteria required. The table with the operator types (Knative® and Credential Rotator) shows what the criteria is and then the T-shirt prediction.

For the example above, the configuration T-shirt sizes and the criteria matrices are simplified to demonstrate how the prediction is made.

In this example, each configuration T-shirt size (e.g. SM-MED) is represented with three-dimensional embedding of User Load, Runtimes, and Failures. The user is the criteria (3D embedding) which represents the operator requirement and the item is then predicted which is the T-shirt configuration size.

Figure 4:
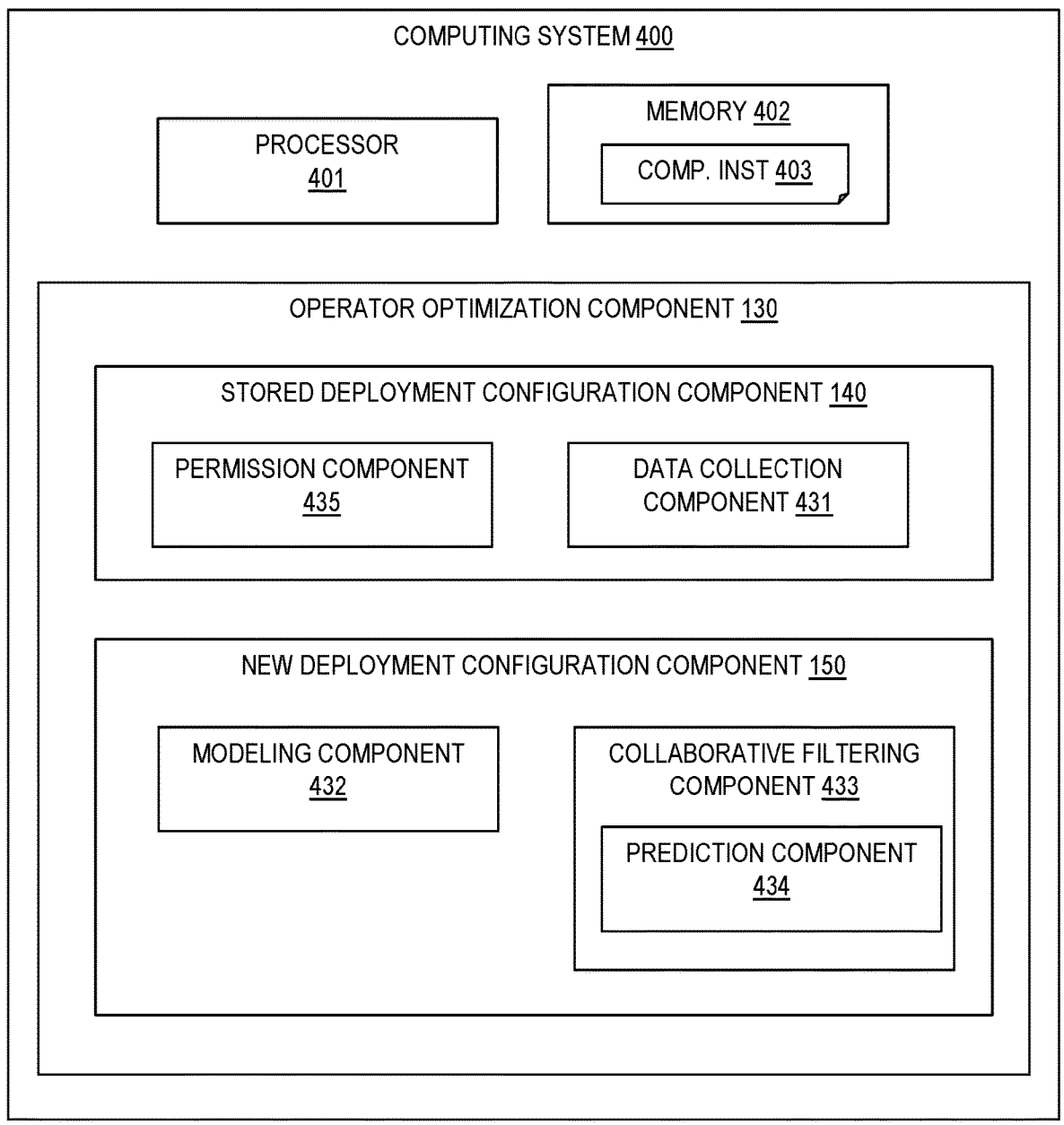
FIG. 4 is block diagram of an example embodiment of a system in accordance with embodiments of the present invention.

FIG. 4 shows a system diagram of a computing system 400 in which the described operator optimization component code 130 may be provided. The computing system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The operator optimization component 130 may include a stored deployment configuration component 140 for obtaining and storing historical deployment configurations. The stored deployment configuration component 140 may include a permission component 435 for obtaining permission to collect data from users.

The stored deployment configuration component 140 may include a data collecting component 431 for collecting historical data for deployment data including operator configurations, cluster configurations, and behavior data.

The data collection component 431 may continuously update data from cloud deployments and may apply a wisdom of the crowd approach to provide granular scalars with increased historical data. The data collection component 431 may collect historical data spread across multiple clusters to broaden the data and minimize bias.

The operator optimization component 130 may include a new deployment configuration component 150 including a modeling component 432 for modeling the deployment data using embedded matrix models. The operator optimization component 130 may include a collaborative filtering component 433 for applying collaborative filtering to process the modeled data to map user requirements for a target deployment to deployment configurations of previous successful deployments including a predication component 434 for outputting one or more predicted deployment configurations as a reference for a target deployment.

The collaborative filtering component 433 may include functionality for applying collaborative filtering uses multiple dimensions based on user requirement criteria and may apply size categories to operator and cluster configurations.

The modeling component 432 may include: modeling a matrix for operator configuration vs cluster configuration sizes; modeling a matrix for behavioral criteria vs combined operator-cluster configuration sizes; and modeling a comparison matrix using scalar ranges for predictions, with the scalar ranges relating to positive and negative ranges of the behavior data as relating to user requirements.

Some of the embodiments of the invention, described above, optimize operator configuration in a computer system. This optimization of course involves balancing and/or trading off various factors affecting (likely) performance of a real world deployment of computer system that uses an embodiment of optimization of operator configuration. Broadly speaking any factor (now known or to be identified in the future) that is relevant to performance of the real world deployment of the computer system that uses operators. More specifically, some embodiments of the present invention may consider one, or more, of the following factors when performing operator configuration optimization: (i) development speed of development of new operators (faster is preferable); and/or (ii) operational speed at which the operator(s) operating under a given operator configuration will perform their function(s), where the operator speed factor considered in doing optimization may include one or more of the following sub-factors: (a) speed of deployment of the software that the operator is acting on, (b) speed of updates to these deployments (typically, operators are also used to update software—which can be important as software updates are done to address security issues for instance, (c) speed of selection of the parameters when installing (this may depend on various factors such as the cluster (for example, in embodiments involving reserved cloud "hardware") that the software will be installed on and/or (d) speed of decision on the dependencies when installing software via a given candidate operator (again, these dependencies typically need to be there in order for the installed software to be usable).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
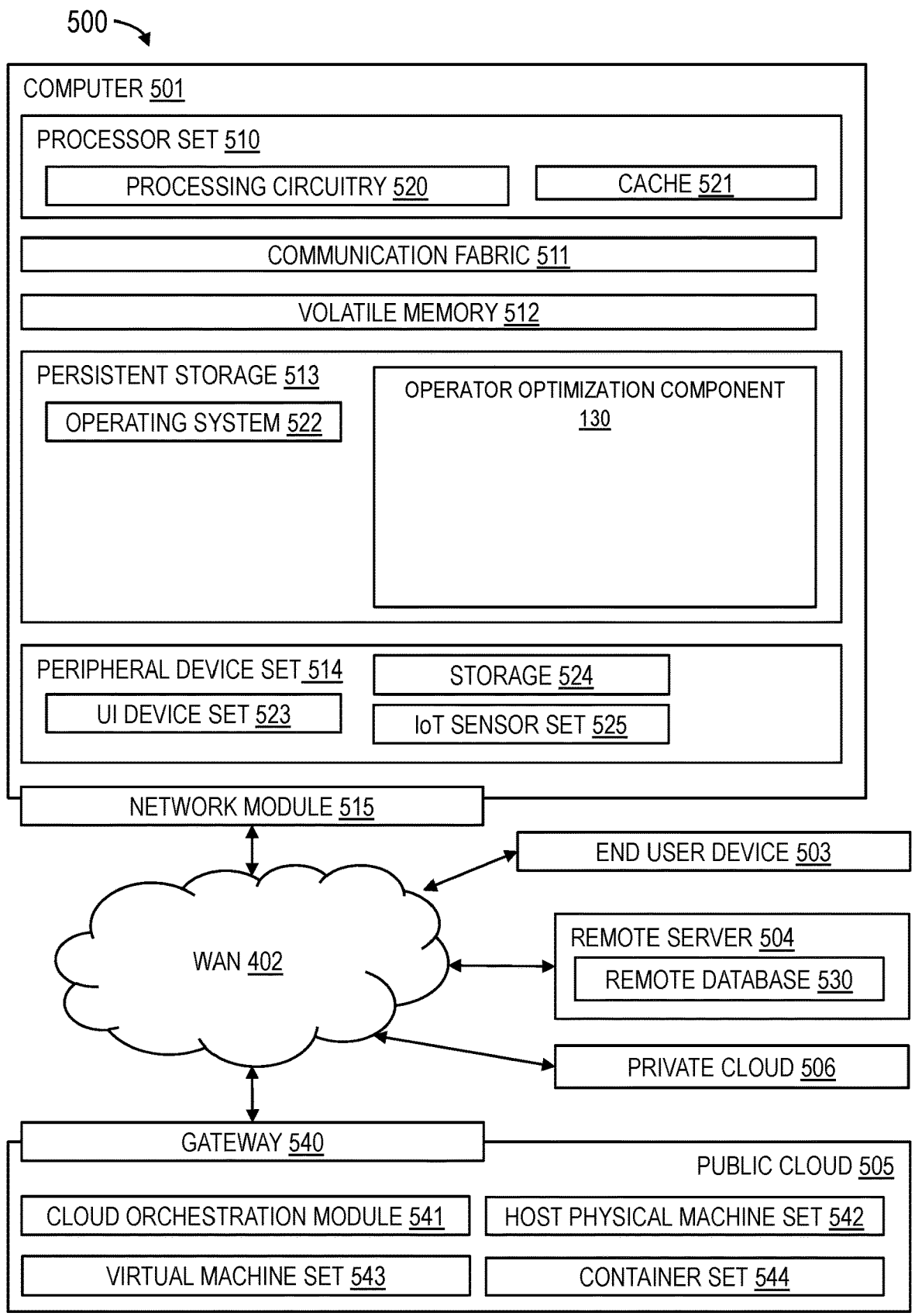
FIG. 5 is a block diagram of an example embodiment of a computing environment for the execution of at least some of the computer code involved in performing the present invention.

Referring to FIG. 5, computing environment 500 contains an example of an environment for the execution of at least some of the computer code involved in performing the inventive methods, such as operator optimization component 130. In addition to block 130, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 130, as identified above), peripheral device set 514 (including user interface (UI) device set 523, storage 524, and Internet of Things (IOT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 130 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 130 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The invention claimed is:

1. A computer-implemented method (CIM) comprising:
collecting historical data for deployment data including operator configurations, cluster configurations, and behavior data;
modeling the deployment data using embedded matrix models;
applying collaborative filtering to process the modeled data to map user requirements for a target deployment of an application to deployment configurations of previous successful deployments;
outputting one or more predicted deployment configurations as a reference for the target deployment; and
optimizing operator configuration for the deployment configuration of the application in a target container orchestration cluster.

2. The method of claim 1 wherein applying collaborative filtering uses multiple dimensions based on user requirement criteria.

3. The method of claim 1 wherein the collaborative filtering includes applying size categories to operator and cluster configurations.

4. The method of claim 1 wherein the optimization of the operator configuration includes consideration of at least the following factor: development speed of development of new operators.

5. The method of claim 1 wherein the optimization of the operator configuration includes consideration of at least the following factor: operational speed at which the operator(s) operating under a given operator configuration will perform their function(s) in the target container orchestration cluster.

6. The method of claim 5 wherein the consideration of operational speed includes consideration of at least one of the following operational speed types: speed of deployment of the application in the target container orchestration cluster, speed of updates to the application in the target container orchestration cluster, speed of selection of parameters when installing the application in the target container orchestration cluster, and/or speed of determination of dependencies when installing the application in the target container orchestration cluster.

7. A computer program product (CPP) comprising:
a set of storage device(s); and
computer code stored collectively in the set of storage device(s), with the computer code including data and instructions to cause a processor(s) set to perform at least the following operations:
collecting historical data for deployment data including operator configurations, cluster configurations, and behavior data,
modeling the deployment data using embedded matrix models,
applying collaborative filtering to process the modeled data to map user requirements for a target deployment of an application to deployment configurations of previous successful deployments,
outputting one or more predicted deployment configurations as a reference for the target deployment, and
optimizing operator configuration for the deployment configuration of the application in a target container orchestration cluster.

8. The computer program product of claim 7 wherein applying collaborative filtering uses multiple dimensions based on user requirement criteria.

9. The computer program product of claim 7 wherein the collaborative filtering includes applying size categories to operator and cluster configurations.

10. The computer program product of claim 7 wherein the optimization of the operator configuration includes consideration of at least the following factor: development speed of development of new operators.

11. The computer program product of claim 7 wherein the optimization of the operator configuration includes consideration of at least the following factor: operational speed at which the operator(s) operating under a given operator configuration will perform their function(s) in the target container orchestration cluster.

12. The computer program product of claim 11 wherein the consideration of operational speed includes consideration of at least one of the following operational speed types: speed of deployment of the application in the target container orchestration cluster, speed of updates to the application in the target container orchestration cluster, speed of selection of parameters when installing the application in the target container orchestration cluster, and/or speed of determination of dependencies when installing the application in the target container orchestration cluster.

13. A computer system (CS) comprising:
a processor(s) set;
a set of storage device(s); and
computer code stored collectively in the set of storage device(s), with the computer code including data and instructions to cause the processor(s) set to perform at least the following operations:
collecting historical data for deployment data including operator configurations, cluster configurations, and behavior data,
modeling the deployment data using embedded matrix models,
applying collaborative filtering to process the modeled data to map user requirements for a target deployment of an application to deployment configurations of previous successful deployments,
outputting one or more predicted deployment configurations as a reference for the target deployment, and
optimizing operator configuration for the deployment configuration of the application in a target container orchestration cluster.

14. The computer system of claim 13 wherein applying collaborative filtering uses multiple dimensions based on user requirement criteria.

15. The computer system of claim 13 wherein the collaborative filtering includes applying size categories to operator and cluster configurations.

16. The computer system of claim 13 wherein the optimization of the operator configuration includes consideration of at least the following factor: development speed of development of new operators.

17. The computer system of claim 13 wherein the optimization of the operator configuration includes consideration of at least the following factor: operational speed at which the operator(s) operating under a given operator configuration will perform their function(s) in the target container orchestration cluster.

18. The computer system of claim 17 wherein the consideration of operational speed includes consideration of at least one of the following operational speed types: speed of deployment of the application in the target container orchestration cluster, speed of updates to the application in the target container orchestration cluster, speed of selection of parameters when installing the application in the target container orchestration cluster, and/or speed of determination of dependencies when installing the application in the target container orchestration cluster.

* * * * *